United States Patent [19]

Kobayashi et al.

[11] 4,054,206
[45] Oct. 18, 1977

[54] CASSETTE CASE

[75] Inventors: Tadashi Kobayashi, Miyagi; Kiichiro Toyoshima, Sendai, both of Japan

[73] Assignee: Sony Corporation, Tokyo, Japan

[21] Appl. No.: 766,202

[22] Filed: Feb. 7, 1977

[30] Foreign Application Priority Data

Feb. 13, 1976 Japan .............................. 51-15540[U]

[51] Int. Cl.² .............................................. B65D 85/67
[52] U.S. Cl. ................................... 206/387; 206/493; 242/200, 220/337
[58] Field of Search ........................................ 206/387, 206/225, 408, 226, 475, 232, 493, 387, 472, 473; 220/339, 337; 242/200

[56] References Cited

U.S. PATENT DOCUMENTS

| | | | |
|---|---|---|---|
| 3,876,071 | 4/1975 | Neal et al. ........................... | 206/387 |
| 3,896,929 | 7/1975 | Mills ..................................... | 206/387 |

*Primary Examiner*—George T. Hall

*Attorney, Agent, or Firm*—Lewis H. Eslinger; Alvin Sinderbrand

[57] ABSTRACT

A storage case for storing a tape cassette that includes a tape reel hub having a cylindrical wall defining a cylindrical recess in the hub with a bottom wall extending across the recess and having a plurality of drive holes formed therein. The case includes an enclosure for receiving and enclosing the tape cassette and a hub engaging member movably mounted in the case for reciprocal movement between retracted and extended positions with respect to one wall of the case. The hub engaging member is located to be received in the reel hub recess when the tape cassette is inserted in the case, and it includes at least one locking button for engaging one of the drive holes of the reel. The hub engaging member is biased towards its extended position to engage the locking button in one of the drive holes of the reel hub when there is alignment therebetween. And, the hub engaging member is held against rotation in the case so that when its locking button is engaged in the drive hole of the reel hub, the hub is locked against rotation.

18 Claims, 6 Drawing Figures

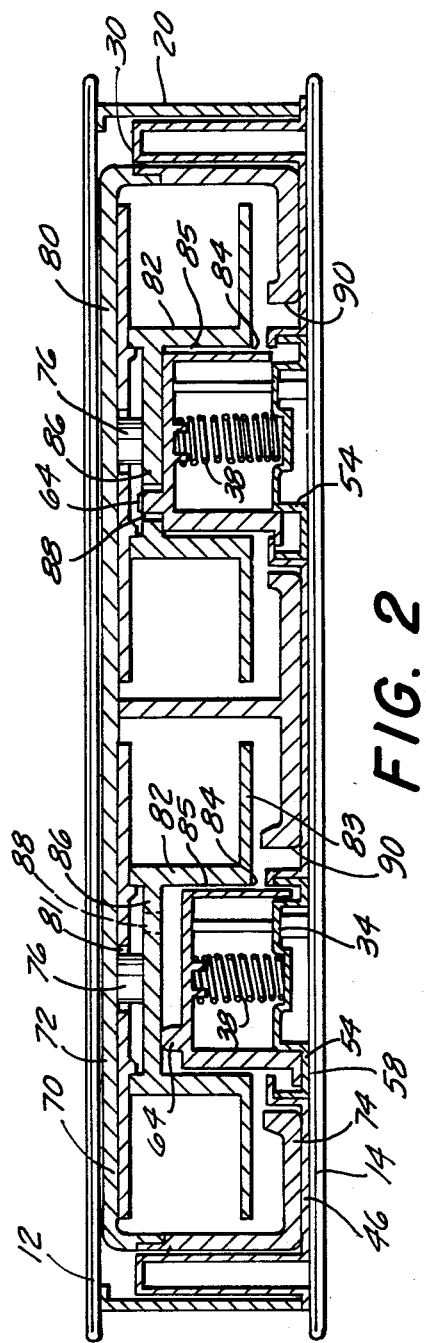
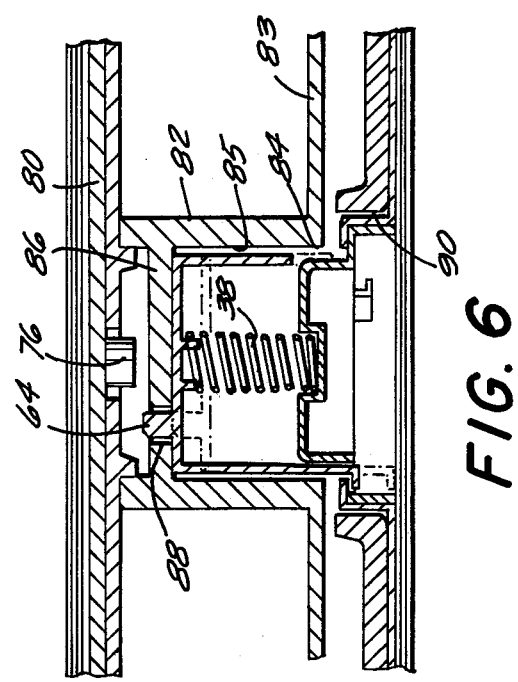

CASSETTE CASE

The present invention relates to a storage case, and more particularly to a storage case for storing a magnetic tape cassette therein and locking the tape reels in the cassette against rotation.

With the ever expanding use of magnetic tape cassettes for recording and storing information, it becomes desirable to provide containers or cases for the cassettes themselves to enable the cassettes, and thus the information thereon, to be conveniently stored for an extended period of time, and also to be shipped from place to place without possible damage. In a typical tape cassette one or more reels are provided to which the magnetic tape is secured. These reels are mounted in the cassette housing to be free for rotation in order to wind and unwind the tape on the reels in accordance with the operation of the tape recording and reproducing machine on which the cassette is used. The reel mounting also permits a degree of lateral movement for the cassette reel between the side walls of the housing. However, with such tape cassettes when the cassette is transported or stored, it is possible that the tape reels will shift or rotate, causing the tape to unwind from the reel and thus extend out of the opening in the edge of the cassette through which recording and reproducing normally takes place. As a result the tape itself can become damaged during the transportation and storing operation.

To alleviate these problems a number of different types of cassette containers or cases have been proposed which serve to lock the tape reels against movement. For example, U.S. Pat. No. 3,272,325 discloses a container for a conventional sound recording tape cassette which uses projecting lugs that are received in the open hubs of the tape reel to lock the reels against rotation during transportation of the cassette. Another form of storage container, particularly suitable for use with video tape cassettes, uses a pair of cylindrical bosses on one wall of the container which extend inwardly to engage in the cylindrical recesses of the reel hubs of a cassette placed in the container. In order to assure satisfactory locking of the cassette hubs, the bosses must be made sufficiently large so that the cassette is forced over the bosses, with the result that the cassette is difficult to remove.

Yet another form of video tape cassette storage container is disclosed in U.S. Pat. No 3,876,071 wherein a self-locking arrangement is provided. In that container structure a non-rotatable locking button is spring biased on a cylindrical hub mounted within the container for engagement in one of the drive holes or openings in the reel hub of the cassette. When the drive opening of the reel hub is aligned with the locking button the button automatically enters the hole and holds the reel against rotation. If the drive hole is not aligned with the locking button when the cassette is placed in the container, the locking button is depressed, and should the reel rotate slightly during transportation one of the drive holes of the reel will ultimately align with the locking button which then automatically snaps into place to lock the reel against further movement.

It is an object of the present invention to provide a storage container for tape cassettes which automatically locks the reel of the cassette against rotation.

Another object of the present invention is to provide an improved self-locking arrangement for tape cassette storage containers.

A further object of the present invention is to provide a storage container which automatically locks the reel hub of a tape cassette to prevent unwinding of tape from the cassette reels.

A still further object of the present invention is to provide a storage container for tape cassettes that has a self-locking arrangement for preventing rotation of the cassette reels and which is relatively simple and inexpensive to manufacture.

In accordance with an aspect of the present invention a storage case is provided for storing a tape cassette of the type having at least one side wall and containing at least one rotatable reel of magnetic tape mounted thereon for axial movement in the cassette towards and away from one side wall. The storage case is particularly adapted to store video tape cassettes of the type which hold a ¾ inch wide magnetic tape and which are manufactured and sold under the trademark "U-MATIC" by Sony Corporation. Such tape cassettes include a pair of reels, each of which has a central hub defined by a cylindrical wall that forms a cylindrical recess in the reel. The recess is closed by a wall which extends across one end of the recess and which has a plurality of reel hub drive holes formed therein. These holes are engaged by driving elements in the recording and reproducing apparatus with which the cassette is normally used in order to rotate the cassette reels. The recesses formed in the cassette hubs are exposed through one of the side walls of the cassette.

The storage case includes a storage container for enclosing the cassette which has a first side wall on which the cassette rests when stored in the container. A generally cylindrical hub engaging member is movably mounted on the first side wall of the container for movement between extended and retracted positions with respect to that container side wall. The hub engaging member is located and dimensioned to be received in the recess of the reel hub when the cassette is placed in the container. The hub engaging member includes a top surface which is adapted to engage the bottom wall of the reel hub in which the drive openings are formed, and that top surface also includes at least one locking button formed thereon for engagement in one of the reel hub drive holes. A spring is divided within the hub engaging member and is operatively engaged between the first flat wall of the container and the hub engaging member to bias the hub engaging member towards its extended position thereby to urge the hub engaging member into the reel hub recess to engage the locking button in one of the drive holes when there is alignment therebetween. The hub engaging member is held against rotation in the container by cooperating means on the hub and in the wall of the container. In this manner when the locking button enters one of the drive openings of the cassette reel the reel is held against rotation. Also, the spring biased arrangement of the hub engaging member holds the tape reel in the cassette against one of the side walls of the cassette and resists lateral movement of the reel within the cassette which would produce rattling noises from the cassette during transportation.

The above, and other objects, features and advantages of this invention will be apparent in the following detailed description of illustrative embodiments thereof, which are to be read in connection with the accompanying drawings, wherein:

FIG. 2 is a longitudinal sectional view taken along line 2—2 of FIG. 1, but with the cover of the container closed;

FIG. 6 is a longitudinal sectional view of the embodiment of FIG. 5.

Figure 1:
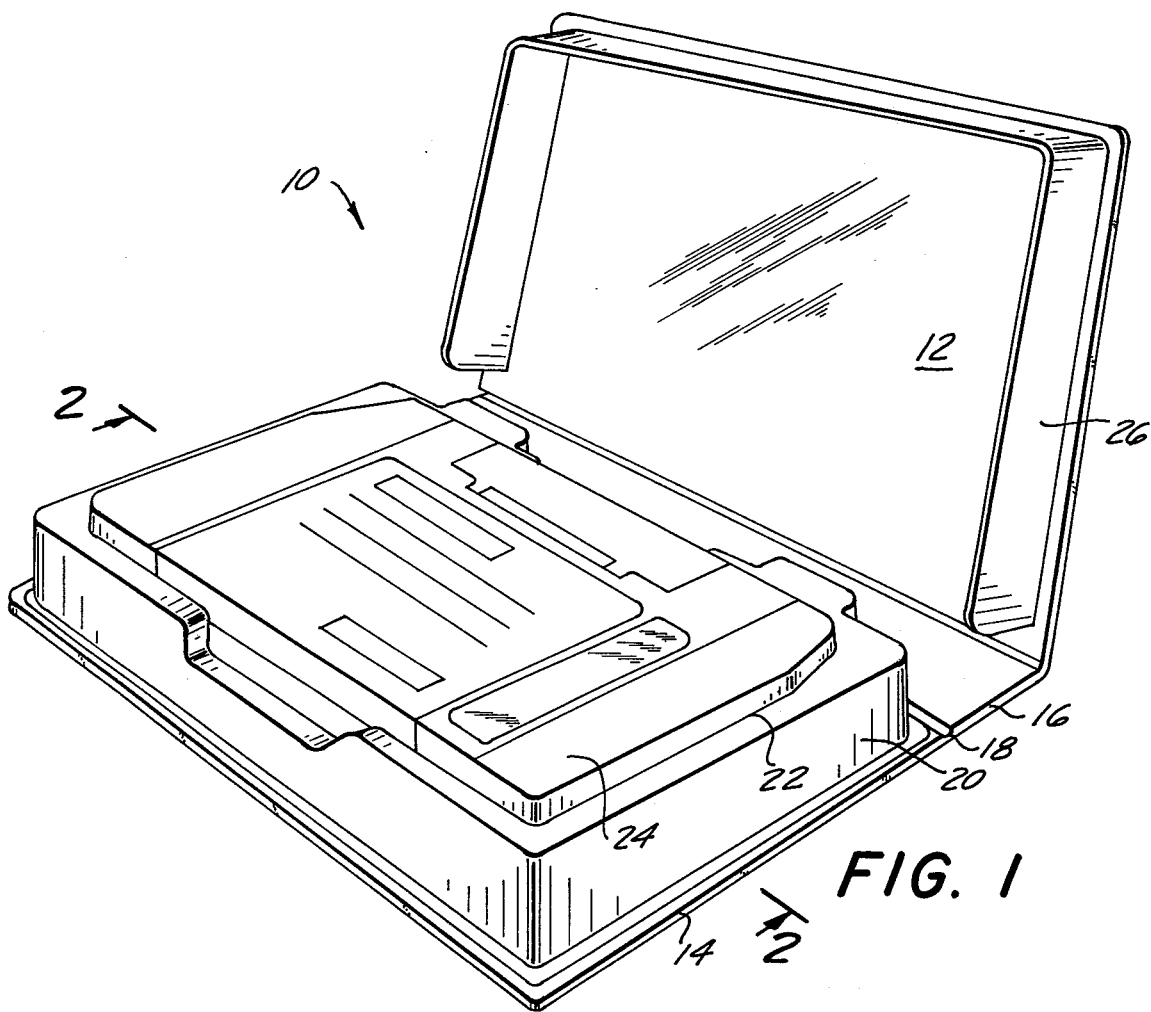
FIG. 1 is a perspective view of a storage container constructed in accordance with the present invention and containing a tape cassette positioned therein.

Referring now to the drawings in detail, and initially to FIG. 1 thereof, a storage case 10 for storing tape cassettes, constructed in accordance with the present invention, comprises an integral hinged box-like enclosure which is adapted to receive a tape cassette therein. Enclosure 10 includes a top wall 12 and a bottom wall 14 which is connected by an end wall 16 and a pair of integral hinges 18. The enclosure is formed in any convenient manner, such as for example, a one piece plastic member with integral hinges formed as reduced thickness sections of the plastic sheet, or from it can be formed from three rigid backing elements, respectively defining walls 12, 14 and 16 covered by inner and outer sheets of heat sealable plastic material.

Wall 14 has a peripheral wall 20 formed thereon, in any convenient manner, which includes an inner surface 22 that has a configuration which is generally complementary to the exterior configuration of the cassette 24 to be stored within the case. Upper wall 12 has a side wall 26 depending therefrom along three of its sides, with this wall being dimensioned to surround three complementary sides of peripheral wall 22.

Peripheral wall 20 on side 14 of case 10 defines a well 30 within which cassette 24 is received. In accordance with the present invention side wall 14 is provided with a pair of locking assemblies 32 in well 30. These locking assemblies are substantially of identical construction, as described hereinafter, and they cooperate with the reels in the tape cassette for locking the reels in position during storage.

Figure 4:
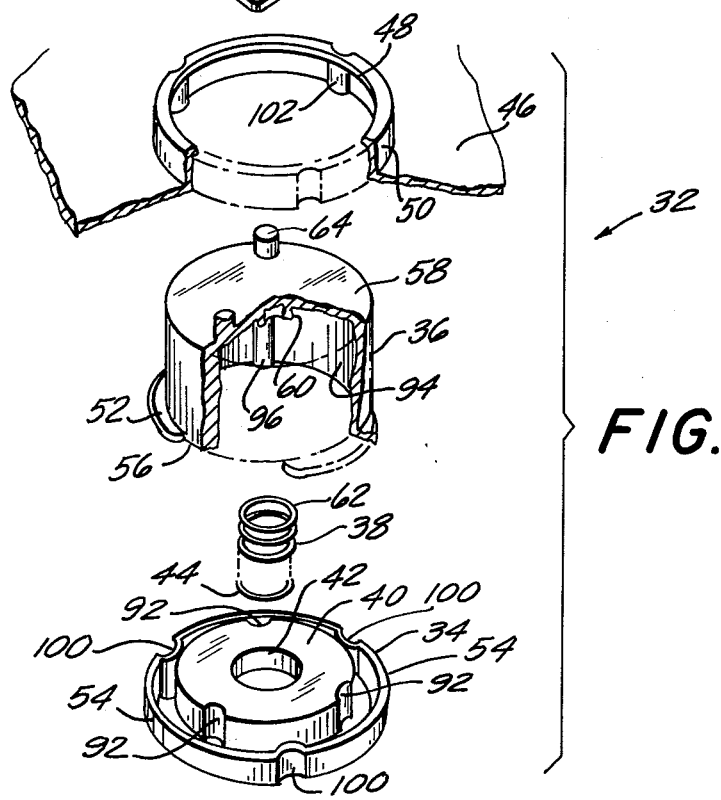
FIG. 4 is an exploded perspective view of the self-locking hub engaging member of the tape cassette of FIGS. 1-3.

One of the assemblies 32 is illustrated in greater detail in FIG. 4. As seen therein the assembly includes a base element 34, a hub engaging member or cylinder 36, and a spring member 38 positiond therebetween. Base 34 includes a central hub 40 having a central recess 42 which receives the lower end 44 of spring 38. The base is retained on side wall 14 by an inner sheet 46 of plastic material secured to the side wall. Sheet 46 has an opening formed therein defined by an L-shaped wall 50 which includes an annular flange 52 that overlies the edge portion 54 of the base.

The generally cylindrical hub engaging member 36 has a cylindrical side wall including flange members 54 formed on its lower edge 56. These flange members are received in the annular well 58 of base member 34, and are located below flange 48 of retaining sheet 46. The top wall 58 of the hub engaging member 36 has, on its lower surface, a stud 60 formed thereon which is surrounded by the upper end 62 of spring 38. In this manner the cylindrical hub engaging member is biased by the spring to an upper position in which flanges 54 engage the lower surface of flange 52, whereby the engagement between the flanges restrains or limits upper movement of hub engaging member 36 under the influence of spring 38.

Top surface 58 of hub engaging member 36 also includes a plurality of locking buttons 64 (three in the illustrative embodiment), although it is to be understood that top surface 58 can be provided with only one or two locking buttons if desired. Locking buttons 64 are located at about 120° from each other by top surface 58 to be received in openings formed in the cassette reel, as described hereinafter.

The tape cassette with which the case of the present invention is to be used is illustrated in detail in the sectional view of FIG. 2. This cassette is of generally conventional construction and, as mentioned, is of the type manufactured by Sony Corporation and sold under the trademark "U-MATIC," Basically the cassette includes a housing 70 having top and bottom walls 72, 74 respectively. The top wall of the cassette includes a pair of inwardly extending posts 76 located in spaced relation to each other. The pins are locating pins for the tape reels 78, 80 within the cassette. The reels contain a length of magnetic tape wound thereon in the well known manner and they are of substantially identical construction, with each reel including a generally circular wall 79 having an aperture 81 formed therein that receives its associated locating post 76. By this arrangement the reel is constructed to rotate about the post, although lateral movement of the reel with respect to the sidewalls 72, 74 of the cassette is permitted.

Each reel also includes a generlly circular wall member 83, spaced from wall 79, which has an integral cylindrical hub 82 formed therewith that is open on its lower end 84 through circular wall 83 to define a cylindrical recess 85 within the reel. The recess provided by the cylindrical hub wall 82 is closed by a wall 86, located below and spaced from circular wall 79. Wall 86 has a plurality, usually three, evenly spaced openings 88 formed therein which cooperate with drive pins on the recording and reproducing device with which this type of cassette is used, to engage the reels with the device for moving the tape during operation of the recording and reproducing device. Wall 74 of the tape cassette is also provided with openings 90 formed therein located in generally axial alignment with posts 76 and cylindrical hubs 82 of the reels, thereby to expose the recesses 85 formed in the reel hubs through the cassette.

When it is desired to store cassette 70 in case 10, the cassette is placed in well 30 provided by peripheral wall 20 with the openings 90 of the cassette facing locking assemblies 32. The diameter of the cylindrical hub engaging members 36 of the locking assemblies is slightly smaller than the diameter of the cylindrical recess provided by hub wall 82 of the reels, so that on insertion of the cassette in the case the locking assemblies readily fit through openings 90 into recesses 85 provided in reel hubs 82. When the cover or wall 12 of the case is closed over wall 14, cassette 70 is urged downwardly into the well so that its bottom wall rests on cover sheet 46 of bottom wall 14. In this manner the top surface of the locking buttons 64 or the top surface 58 of hub engaging member 36 engages the lower surface of reel hub walls 86 and urges the reels upwardly in the cassette, as illustrated in FIG. 2, so that the circular wall 79 of the reels engage the lower surface of wall 72 of the cassette. In this regard the height of the cylindrical hub engaging members 36 is selected so that, as illustrated in FIG. 2, the reels will be urged against wall 72 of the cassette with member 36 in its lower or retracted position. If the aperture 88 in wall 86 of the tape reels do not align with the locking buttons 64 when the cassette is inserted, the tape reels and the cylindrical hub engaging member 36 assume the retracted position illustrated at the left in FIG. 2. On the other hand, if, by chance, the apertures 88 in reel wall 86 do not align with the locking buttons 64, then the cylindrical hub engaging member 36 moves upwardly, as illustrated at the right in FIG. 2, to its extended position so that locking buttons 64 enter openings 88.

Cassette engaging hub 36 and base 34 are constructed to restrain member 36 against rotation so that when the locking buttons 64 enter openings 88, the cassette reels are constrained against rotation. In the illustrative embodiment of the invention this locking arrangement is provided by cooperating means formed on base 34 and the interior of cylindrical member 36. As seen most clearly in FIG. 4, hub portion 40 of the base member 34 is provided with three longitudinally extending arcuate recesses 92 which are located in evenly spaced relation to each other, at about 120° apart. Similarly, the inner surface 94 of cylindrical member 36 is provided with longitudinally extending ribs 96 that are complementary to recesses 92. When locking assemblies 32 are assembled cylindrical member 36 is positioned so that the ribs 96 align and mate with the recesses 92. The flange 52 of cover sheet 46 then restrains upward movement of cylinder 36 and prevents disengagement of the ribs from the recesses. Accordingly the cylindrical member is held against rotation.

In the case where openings 88 in the reel wall 86 do not align with locking buttons 64 when the cassette is placed in the case, the reels are still free to rotate, although held against top wall 72 of the cassette by spring 38. This restrains the cassette reels against lateral movement with respect to the sides of the cassette, thereby avoiding rattling of the reels in the cassette during transportation. However, if the case is jarred, or moved, such that the reels tend to rotate, the openings 88 in reel walls 86 will rotate into a position in alignment with locking buttons 64. At this point spring 36, which is continuously biasing member 36 upwardly, immediately moves the locking buttons into openings 38 and restrains further rotation of the cassette reel. In addition even though the locking buttons enter openings 88, the hub engaging member 36 is held in its extended position to continuously hold the reel against cassette wall 72 to resist rattling of the reel in the cassette.

Base 34 is itself restrained against rotation in bottom wall 14 of the case, by the cooperation of recesses 100 formed in its outer annular wall 54, with corresponding ribs 102 formed in the vertical wall of the L-shaped portion 50 of the sheet 46.

Figure 5:
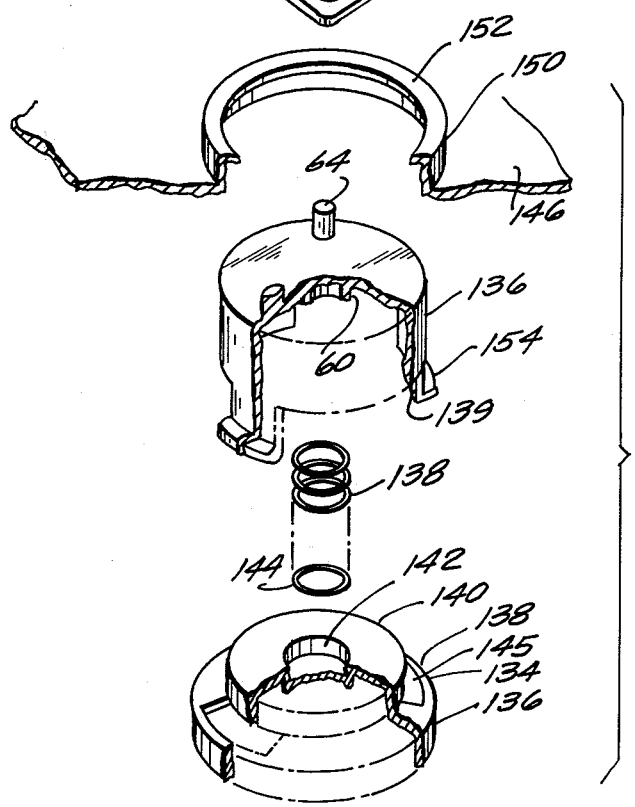
FIG. 5 is an exploded perspective view similar to FIG. 4 of another embodiment of the hub engaging member.

Another embodiment of the locking assemblies 32 of the present invention is illustrated in FIGS. 5 and 6 of the drawings. In this embodiment a base member 134 is provided corresponding to base member 34 previously described embodiment, but in this case the base has a first circular section 136 providing an annular shoulder 138 about an upwardly extending second circular disk member or hub 140. This hub has a central recess 142 formed therein for receiving the lower end of a coil spring 138. In addition a hub engaging member 136 is provided which is substantially identical to hub engaging member 36 previously described with the addition of downwardly extending legs 139 formed thereon. Preferably hub engaging member 136 is provided with three such legs, each of which includes an outwardly extending flange 154. These legs are received in generally complementary apertures 145 formed in shoulder 138 of disk 136. The engagement of the legs in the openings 145 restrain cylindrical hub engaging member 136 from rotation, and are used in lieu of the complementary recesses and ribs 92, 94 of the previously described embodiment. Upward movement of the cylindrical member 136, such as would disengage the legs 139 from openings 145, is prevented by cover sheet 146 and the annular flange 152 formed in the wall 150 thereof.

Figure 3:
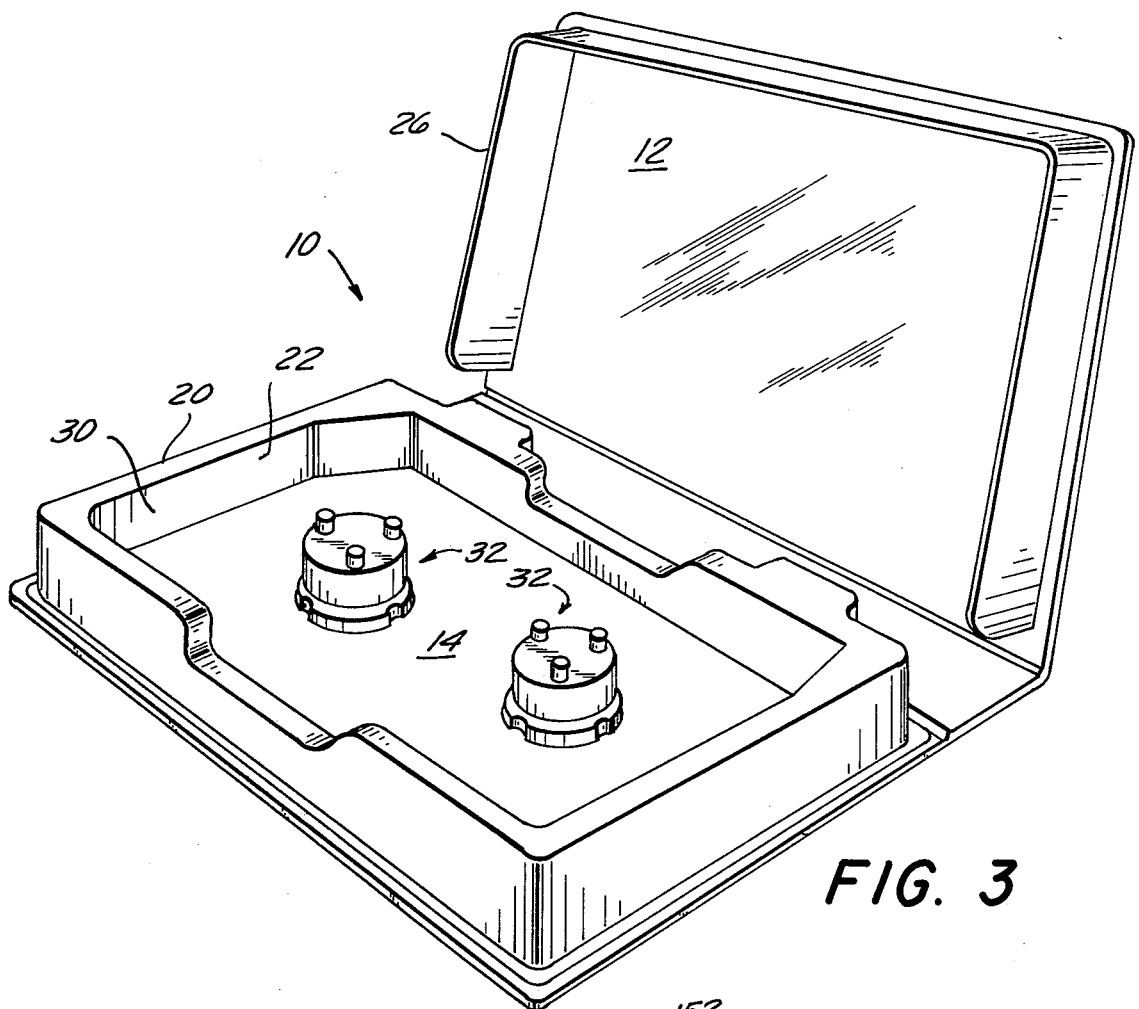
FIG. 3 is a perspective view similar to FIG. 1 of the storage container of the invention, but with the tape cassette removed.

The operation of the locking assembly of FIGS. 5 and 6 is identical to the locking assembly 34 described above with respect to FIGS. 3 and 4. Thus these assemblies also serve to automatically lock the cassette reels against rotation upon insertion of the cassette into the storage case if openings 88 are aligned with the locking buttons 64. In the event that openings 88 do not align with locking buttons 64, the cassette reels will automatically become locked upon rotation of the reels in the cassette as a result of movement or vibrations imparted to the cassette during storage or transportation of the storage case. In addition the reels are restrained against lateral movement in the cassette between the side walls thereof.

Accordingly, it is seen that a relatively simply constructed storage case is provided for tape cassettes which will automatically restrain rotation and lateral movement or vibrations of the cassette reels.

Although illustrative embodiments of the invention have been described herein with reference to the accompanying drawings, it is to be understood that the invention is not limited to those precise embodiments thereof and that various changes and modifications may be effected therein by one skilled in the art without departing from the scope or spirit of this invention.

What is claimed is:

1. A storage case for storing a tape cassette which includes a tape reel hub having a cylindrical side wall defining a cylindrical recess in the hub and a bottom wall extending across the recess and having a plurality of reel hub drive holes formed therein, said storage case comprising, enclosure means for receiving and enclosing a tape cassette therein, a hub engaging member movably mounted in said case for reciprocal movement between first and second positions and being located to be received in the reel hub recess when the tape cassette is inserted in the case, said hub engaging member including at least one button for engagement in one of said drive holes, and means for biasing said member towards its second position to urge the member into the reel hub recess to engage said button in one of said drive holes when there is alignment therebetween.

2. A storage case as defined in claim 1 including means for preventing rotation of said hub engaging member whereby when said button thereon is engaged in a drive hole of the reel hub the hub is locked against rotation.

3. A storage case as defined in claim 2 wherein said cassette has opposed spaced side walls defining a chamber in which said reel is located and one of said walls has an opening therein for receiving said hub engaging member therein, said spring means urging said hub engaging member toward the other of said cassette walls to hold said reel against said other wall to resist movement of the reel during storage of the cassette in said case.

4. A storage case as defined in claim 3 wherein said cassette has two of said reel hubs and said case includes two of said hub engaging members.

5. A storage case as defined in claim 1 wherein said case has a first flat wall on which said cassette is placed during storage in said container, said hub engaging means being mounted on said first flat wall and extending therefrom inwardly of said first flat wall to the interior of said case; said hub engaging memer and said first flat wall including cooperating means for preventing rotation of said hub engaging member whereby said button thereon is engaged in a drive hole of the reel hub the hub is locked against rotation.

6. A storage case as defined in claim 5 wherein said cooperating means comprises at least one protuberance and one elongated recess receiving the protuberance formed respectively in one of said hub engaging members and said first flat wall.

7. A storage case as defined in claim 5 wherein said hub engaging member is a hollow generally cylindrical element and said case includes a base member mounted in said first flat wall having a central hub portion extending upwardly into said cylindrical hub engaging member, said hub portion having longitudinal recesses formed therein and said cylindrical hub engaging member including complementary inwardly extending ribs received in said recesses whereby said ribs and recesses define said cooperating means preventing rotation of the hub engaging element.

8. A storage case as defined in claim 5 wherein said first flat wall includes an annular flange formed therein defining an opening through which said hub engaging member extends, said hub engaging member including at least one outwardly extending flange formed thereon located below said annular flange, whereby said flanges engage each other and define the second outermost position of said hub engaging member under the bias of said spring means.

9. A storage case as defined in claim 5 wherein said hub engaging member is a hollow generally cylindrical element and said case includes a base member mounted in said first flat wall having a central hub portion extending upwardly into said cylindrical hub engaging member, said base including a shoulder portin surrounding said upwardly extending hub portion, said shoulder portion having at least one opening formed therein and said hub engaging member including an extension received in said opening in the base shoulder whereby said extension and opening define said cooperating means.

10. A storage case as defined in claim 9 wherein said extension includes a flange portion located below said shoulder whereby the shoulder and flange cooperate to limit movement of said hub engaging member to its second position under the influence of said spring means.

11. A storage case for storing a tape cassette of the type having at least one side wall and containing at least one rotatable reel of magnetic tape mounted therein for axial movement in the cassette towards and away from said one side wall and including a central hub having a cylindrical side wall defining a cylindrical recess therein and a bottom wall extending across the recess and having a plurality of reel hub drive holes formed therein; said side wall of the cassette having an opening therein exposing the recess in the reel hub and said storage case comprising a storage container for enclosing said cassette and having a first side wall on which said cassette rests when stored in the container; a generally cylindrical hub engaing member movably mounted on said first side wall for movement between extended and retracted positions with respect to said first side wall; said hub engaging member being located and dimensioned to be received in the recess of said hub reel when the cassette is placed in said container and having a top wall adapted to engage said bottom wall of the reel hub; said top wall including at least one button extending therefrom for engagement in one of the door holes on said reel hub bottom wall, and spring means positioned within said hub engaging member and operatively engaged between said first flat wall of the container and the top wall of said hub engaging member to bias said hub engaging member towards its extended position thereby to urge said hub engaging member into the reel hub recess to engage said button in one of said drive holes when there is alignment therebetween; and means for preventing rotation of said hub engaging member whereby when said button thereon is engaged in a drive hole of the reel hub the hub is locked against rotation in the cassette.

12. A storage case as defined in claim 11 wherein said first flat wall of said container includes a peripheral wall having an internal configuration which is generally complementary to the peripheral configuration of said cassette.

13. A storage case as defined in claim 11 wherein said cassette has two of said reel hubs and said case includes two of said hub engaging members.

14. A storage case as defined in claim 12 wherein said means for preventing rotation of said hub engaging member comprises cooperating means on said first flat wall and said hub engaging member for preventing roation of the hub engaging member whereby when said button thereon is engaged in a drive hole of the reel hub the hub is locked against rotation.

15. A storage case as defined in claim 14 wherein said case includes a base member mounted in said first flat wall having a central hub portion extending upwardly into said cylindrical hub engaging member, said hub portion having longitudinal recesses formed therein and said cylindrical hub engaging member including complementary inwardly extending ribs received in said recesses whereby said ribs and recesses defining said cooperating means preventing rotation of the hub engaging element.

16. A storage case as defined in claim 15 wherein said first flat wall includes an annular flange formed therein defining an opening through which said hub engaging member extends, said hub engaging member including at least one outwardly extending flange formed thereon located below said annular flange, whereby said flanges engage each other and define the extended position of said hub engaging member.

17. A storage case as defined in claim 14 wherein said case includes a base member mounted in said first flat wall having a central hub portion extending upwardly into said cylindrical hub engaging member, said base including a shoulder portion surrounding said upwardly extending hub portion, said shoulder portion having at least one opening formed therein and said hub engaging member including an extension received in said opening in the base shoulder whereby said extension and opening define said cooperating means.

18. A storage case as defined in claim 17 wherein said extension includes a flange portion located below said shoulder whereby the shoulder and flange cooperate to limit movement of said hub engaging member to its second position under the influence of said spring means.

* * * * *